W. DE F. CROWELL.
CLEAR VISION WINDSHIELD FOR VEHICLES.
APPLICATION FILED FEB. 12, 1918.
1,361,231.
Patented Dec. 7, 1920.
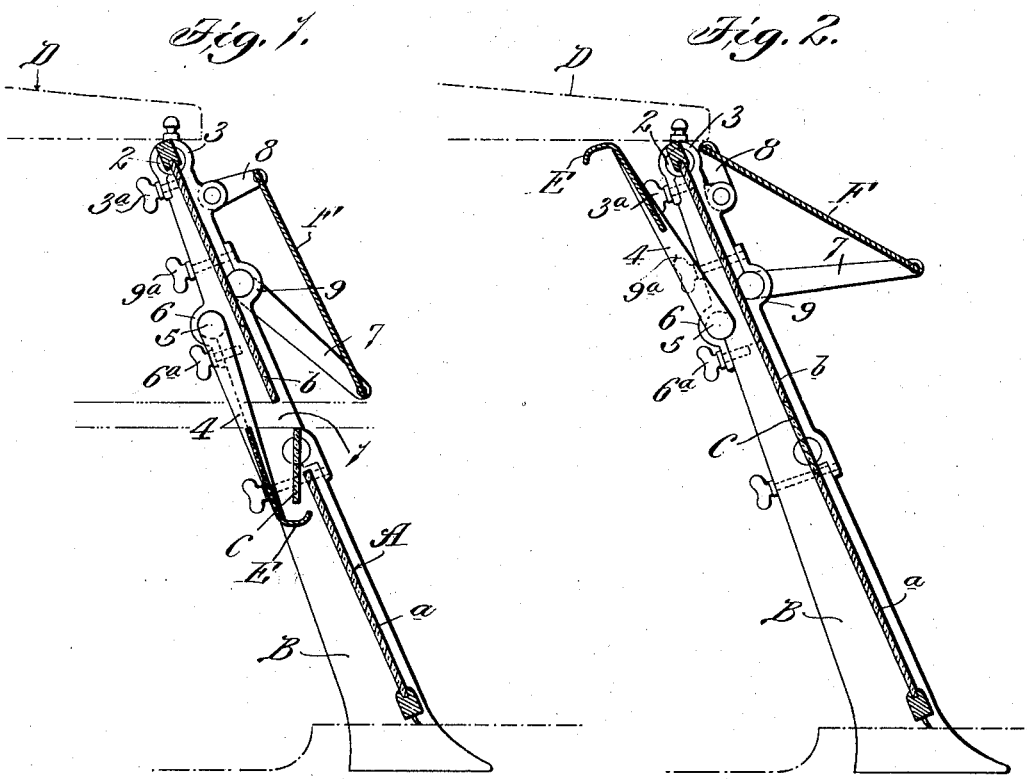
Inventor,
William de F. Crowell.
By Bakewell & Church, Attys.

UNITED STATES PATENT OFFICE.

WILLIAM DE FORREST CROWELL, OF ST. LOUIS, MISSOURI.

CLEAR-VISION WINDSHIELD FOR VEHICLES.

1,361,231.

Specification of Letters Patent.

Patented Dec. 7, 1920.

Application filed February 12, 1918. Serial No. 216,825.

*To all whom it may concern:*

Be it known that I, WILLIAM DE FORREST CROWELL, a citizen of the United States, residing at St. Louis, Missouri, have invented a certain new and useful Improvement in Clear-Vision Windshields for Vehicles, of which the following is a full, clear, and exact description, such as will enable others skilled in the art to which it appertains to make and use the same.

This invention relates to wind shields for automobiles, motor boats, aeroplanes, street cars, locomotives and other vehicles and conveyances.

The main object of my present invention is to provide a wind shield of novel design and simple construction that affords a clear vision in inclement weather for the operator in charge of the vehicle on which it is used, and also complete protection for said operator and the other occupants from air currents, rain, snow, sleet, etc.

Another object is to provide a wind shield that is equipped with a horizontally-disposed slot or open space that affords a clear vision for the operator in inclement weather and a member arranged in front of the upper part of the shield and so disposed with relation to said slot that it prevents a heavy driving rain from beating inwardly through said slot, thereby making it practicable to provide the shield with a relatively wide clear vision slot. Other objects and desirable features of my invention will be hereinafter pointed out.

To this end I have devised a wind shield that comprises a wall provided intermediate its upper and lower edges with a horizontally-disposed clear vision slot or open space and an air deflecting portion at the lower side of said slot disposed at such an angle with relation to the front side of the shield that the air which strikes the lower part of the shield when the vehicle is in motion will circulate upwardly over the shield and divert or shunt off any air, light snow, dust, etc. that is traveling toward said slot and which would pass inwardly through the slot if it were not for said upwardly flowing current of air. The air deflecting portion above referred to can either be rigidly mounted or adjustably mounted, it can be formed integral with the lower part of the shield, or it can be formed by an adjustable member mounted in such a manner that it can be used as a closure for the clear vision slot or open space in the shield. The shield is preferably provided with a member that is arranged in front of the upper part of the shield at a point above the clear vision slot or open space, so as to coöperate with the upper portion of the shield to form an up-draft flue and also to prevent a heavy driving rain or driving snow or sleet from beating inwardly through said slot, thus making it practicable to equip the shield with a relatively wide clear vision slot. Said member is not essential, however, to the successful operation of my shield and can be omitted, if desired, or used in combination with other types of clear vision wind shields. When the shield is equipped with such a member it is preferable to mount said member in such a manner that it can be arranged in a position to serve as a rain vizor or as a sun shade or shield that prevents the direct rays of the sun from striking the eyes of the operator or from striking the upper part of the shield and producing a glare, in case the upper part of the shield is formed of glass or other transparent material. Any suitable means can be used to protect the operator from rain, heavy snow and sleet that drips from the top edge of the clear vision slot in the shield or which beats inwardly through said slot in an ordinary rain storm or snow storm, but the means that I prefer to use for this purpose consists of a gutter arranged at the rear side of the shield below the clear vision slot. If desired, said gutter can be mounted in such a manner that when it is not in use it can be arranged in an inoperative position adjacent the upper edge of the shield. The various parts of the shield above referred to can be mounted in various ways on any kind of a suitable supporting structure, and the wall of the shield in which the horizontally-disposed clear vision slot is formed can either be opaque or transparent. I have herein illustrated my invention embodied in a shield for an automobile body of the open type, but I wish it to be understood that the invention is applicable to wind shields for closed automobile bodies, and in fact, to wind shields for practically all kinds of vehicles and conveyances.

Figure 1 of the drawings is a vertical sectional view of a wind shield constructed in accordance with my present invention, showing the parts arranged in the positions they assume when the shield is used in inclement weather.

Fig. 2 is a vertical sectional view of said shield, showing the parts arranged in the positions they assume in fair weather or when it is not necessary to use the clear vision slot in the shield.

Fig. 3 is a front elevational view of the shield shown in Fig. 1; and

Fig. 4 is a detail sectional view, illustrating a modification of my invention.

Referring to the drawings, the reference character A designates a vertically-disposed or rearwardly-inclined wall that is provided intermediate its upper and lower edges with a horizontally-disposed slot or open space 1 that affords a clear vision for the operator in charge of the vehicle. If said wall, particularly the upper part of same, is constructed of glass or other suitable transparent material, as is desirable in case the shield is designed for use on an automobile, the upper part of said wall can become completely coated with rain, snow or sleet without materially interfering with the view of the operator, due, of course, to the fact that the clear vision slot 1 is of sufficient size to enable the operator to clearly see the road. The upper and lower parts of the wall A that lie above and below the slot 1 can either be formed by pieces of material that are mounted on a supporting structure, such, for example, as side standards B that are secured in any suitable manner to the body of the vehicle, or the lower part of said wall can be formed by a portion of the body of the vehicle, as shown in Fig. 4, wherein the reference character $a'$ designates the cowl of an automobile body which slopes upwardly and rearwardly and terminates at a point below a member $b'$ which forms the upper part of the shield, said member $b'$ being spaced away from the top edge of the cowl $a'$ so as to form a horizontally-disposed clear vision slot or opening 1. As it is immaterial how the member $b'$ is mounted, I have not shown in Fig. 4 the supporting structure for said member. In the form of my invention shown in Figs. 1 and 2 the members $a$ and $b$ that constitute the lower and upper parts of the wall A can either be rigidly mounted on the side standards B or adjustably mounted on said side standards, it being preferable to provide the frame of the upper member $b$ with trunnions 2 that fit in bearings 3 on the standards B which are equipped with adjusting screws $3^a$, thereby enabling the upper member $b$ to be arranged in various positions.

As previously stated, my improved shield is provided with an air deflecting portion that is arranged at the lower edge of the clear vision slot 1. In the form of my invention shown in Figs. 1 and 2 said air deflecting portion is formed by a member C, which is adjustably mounted on the side standards B in such a manner that it can be arranged in the position shown in Fig. 1, wherein it serves as an air deflecting lip that causes the air to circulate upwardly and also forwardly with relation to the part of the shield that lies immediately above the slot 1, or in the position shown in Fig. 2, wherein it serves as a closure for said clear vision slot. In inclement weather the member C is arranged in the position shown in Fig. 1 so as to provide a clear view for the operator through the slot 1. When the vehicle is in motion the air that strikes the front side of the lower part $a$ of the shield will flow upwardly over said part and strike the deflecting lip produced by the member C, said deflecting lip causing the current of air to be deflected upwardly and also forwardly with relation to the upper part $b$ of the shield that forms the top edge of the clear vision slot 1. Consequently, when the vehicle is in motion, a current of air will circulate upwardly over the front side of the shield with sufficient force to prevent counter air currents, dust, light snow, etc. from blowing inwardly through the slot 1, the current of air that circulates upwardly over the front side of the shield escaping rearwardly over the top D of the vehicle. In the form of my invention shown in Fig. 4 the cowl $a'$ and the deflecting lip $C'$ at the upper edge of the cowl produce the same result as the member C and the lower part $a$ of the shield shown in Fig. 1.

In order to protect the driver and the other occupant of the front seat from rain, heavy snow and sleet that drip from the upper edge of the clear vision slot 1, or which beat in through said slot, I prefer to provide the shield with a gutter which is so arranged that it will collect said rain, snow or sleet. In the form of my invention shown in Figs. 1 and 2 a gutter E is carried by a pair of arms 4 that are pivotally mounted on the side standards B in such a manner that the gutter can be arranged in the position shown in Fig. 1 when the clear vision slot is in use, or in the position shown in Fig. 2 when the member C is arranged in position to serve as a closure for said slot. It is immaterial how the arms 4 are mounted on the standards B, but one convenient way of constructing the shield is to provide the arms 4 with trunnions 5 that fit in adjustable bearings 6 on the standards B that are provided with adjusting screws $6^a$ or other suitable actuating devices. In the form of my invention shown in Fig. 4 a gutter E' is permanently connected to the cowl $a'$ at the rear of the deflecting lip $C'$.

If desired, the shield can be provided with a member that can be arranged in position to prevent a driving rain or driving snow or sleet from beating inwardly through the clear vision slot, or in a position to serve as a sun shade or shield which prevents the direct rays of the sun from striking the eyes of the operator or the upper part of the wall of the shield through which the operator is looking. When the shield is constructed in this manner it is equipped with an opaque member F that is connected by arms or other devices 7 and 8 to the side standards B in such a manner that it can be arranged either in the position shown in Fig. 1 or in the position shown in Fig. 2. When said member F is arranged in the position shown in Fig. 1 it prevents rain, snow or sleet from driving inwardly through the clear vision slot during a heavy gale or storm of unusual violence. It also coöperates with the upper part b of the shield to form a flue that tends to induce a circulation of air upwardly over the front side of the shield. When said member F is arranged in the position shown in Fig. 2 it serves as a sun shade or shield for the upper part b of the shield. The arms 7 and 8 are provided with trunnions that fit in bearings on the side standards B, and one set of said bearings, for example, the bearings 9 that receive the trunnions on the arms 7, are provided with adjusting screws 9ᵃ that can be tightened so as to hold the arms 7 and 8 in adjusted position, or loosened to permit the member F to be arranged in the desired position.

While I have herein illustrated the combined flue member and sun shade F in combination with a clear vision wind shield of the construction shown in Fig. 1, I wish it to be understood that said member is not limited to use with such a shield, but is capable of use with any clear vision wind shield in which an upward circulation over the front side of the shield is used to prevent air and the like from blowing inwardly through the clear vision slot of the shield. Moreover, it is immaterial how the member F is mounted, so long as it can be arranged in one position to coöperate with the upper portion of the shield to form an up-draft flue and in a different position to serve as a sun shade or rain vizor.

A wind shield of the construction above described provides a clear vision for the operator in inclement weather, owing to the fact that it has a horizontally-disposed slot or open space through which the operator can clearly see the road, and it also affords complete protection for the operator against air currents because it is so designed that when the vehicle is in motion a current of air circulates upwardly over the front side of the shield in such a manner that it diverts or shunts off any air currents that try to enter the clear vision slot. Furthermore, it completely protects the operator and the other occupant of the front seat from rain, heavy snow, sleet and the like that drip from the upper edge of the clear vision slot, owing to the fact that it comprises a gutter which is so disposed that it collects said rain, snow or sleet. When it is equipped with an adjustable member F of the kind shown in Figs. 1 and 2 it also eliminates the discomfiture of driving toward the sun, because said member F, when arranged in the position shown in Fig. 2, prevents the direct rays of the sun from striking the upper part of the wall of the shield.

Having thus described my invention, what I claim, and desire to secure by Letters Patent, is:

1. A wind shield for vehicles and conveyances, comprising a wall provided with a clear vision slot, and a pivotally mounted member combined with said wall in such a manner that when it is revolved in one direction it will fill said slot, thus forming a closure for same, and when it is revolved in the opposite direction it will form an upwardly and forwardly inclined deflecting lip at the lower side of said slot.

2. A wind shield for vehicles and conveyances, comprising a wall provided with a horizontally-disposed clear vision slot, side standards that carry said wall, adjustable arms arranged at the rear side of said wall, and a gutter carried by said arms, said arms being adapted to be adjusted so as to position said gutter either in an inoperative position above said slot or in an operative position below said slot.

3. A wind shield, comprising a wall provided with a horizontally-disposed clear vision slot, standards that carry said wall, an adjustable member on said standards that can be arranged either in a position to serve as a closure for said slot or in a position to serve as an air deflecting lip of the character described, adjustable arms mounted on said standards at the rear side of said wall, a gutter carried by said arms, and a combined rain deflector and sun shade adjustably mounted on said standards and arranged in front of the upper part of said wall.

4. A wind shield, comprising a wall provided with a horizontally-disposed clear vision slot, and a member located in front of the upper part of the shield above said slot and adapted to be arranged in one position wherein it coöperates with the upper part of said wall to form an up-draft flue or in a different position wherein it serves as a sun shade.

5. A wind shield, comprising a wall provided with a horizontally-disposed clear vision slot, and a member located in front of the upper part of said wall above said slot and adapted to be arranged in a position substantially parallel to the upper part of said wall so as to coöperate with same to form a flue up through which air circulates or in a position at an angle to the upper part of said wall for the purpose specified.

6. A wind shield, comprising a wall provided with a horizontally-disposed clear vision slot, a supporting structure that carries said wall, a member located in front of the upper part of said wall above said slot, and an adjustable means on said supporting structure that carries said member and which permits said member to be arranged either in a position to serve as a sun shade or in a position wherein it coöperates with the upper part of said wall to form an updraft flue 7. A wind shield, comprising a wall provided with a horizontally-disposed clear vision slot, means for baffling air upwardly across said slot, a combined flue member and sun shade located in front of the upper part of said wall above said slot, and an adjustable means that carries said member.

WILLIAM de FORREST CROWELL.